July 30, 1935.  M. MALLORY  2,009,934
GOVERNOR
Filed Dec. 23, 1933  3 Sheets-Sheet 1

Inventor
MARION MALLORY

By E. N. Lovewell
Attorney

July 30, 1935.     M. MALLORY     2,009,934
GOVERNOR
Filed Dec. 23, 1933     3 Sheets-Sheet 2

Inventor
MARION MALLORY

E. N. Lovewell

By

Attorney

July 30, 1935.  M. MALLORY  2,009,934
GOVERNOR
Filed Dec. 23, 1933  3 Sheets-Sheet 3

Inventor
MARION MALLORY

By E. N. Lovewell
Attorney

Patented July 30, 1935

2,009,934

UNITED STATES PATENT OFFICE 2,009,934

GOVERNOR

Marion Mallory, Detroit, Mich., assignor to Mallory Research Company, Toledo, Ohio, a corporation of Delaware Application December 23, 1933, Serial No. 703,705

13 Claims. (Cl. 64—90.5)

The object of this invention is to advance the timing of the ignition of an internal combustion engine in three or four stages, depending on the load and speed. The result sought is that under a light load the following governor characteristics should prevail:—

At extreme idling (250 revolutions) minus 2°.
From idling (250) to 600 R. P. M. advance to 7°.
From 600 R. P. M. to 1000 R. P. M. advance to 9°.
From 1000 R. P. M. to 1200 R. P. M. advance to 20°.
From 1200 to 1800 R. P. M. advance to 23°.
Above 1800 R. P. M., a constant advance is satisfactory.

When under a load, advance from 7° at 600 R. P. M. to 23° at 3600 R. P. M.

Obviously, there is no simple mechanism available to accomplish this complicated result, and I have discovered that by using a double spring, I can obtain this result:—

I arrange one spring so that it is radial. I arrange a second spring to act circumferentially, and I thus get a sudden advance when the radial spring is displaced circumferentially, sufficiently to set up a circumferential component, which overcomes the second spring, thereby producing the desired "hop" in the governor curve.

Figure 1:
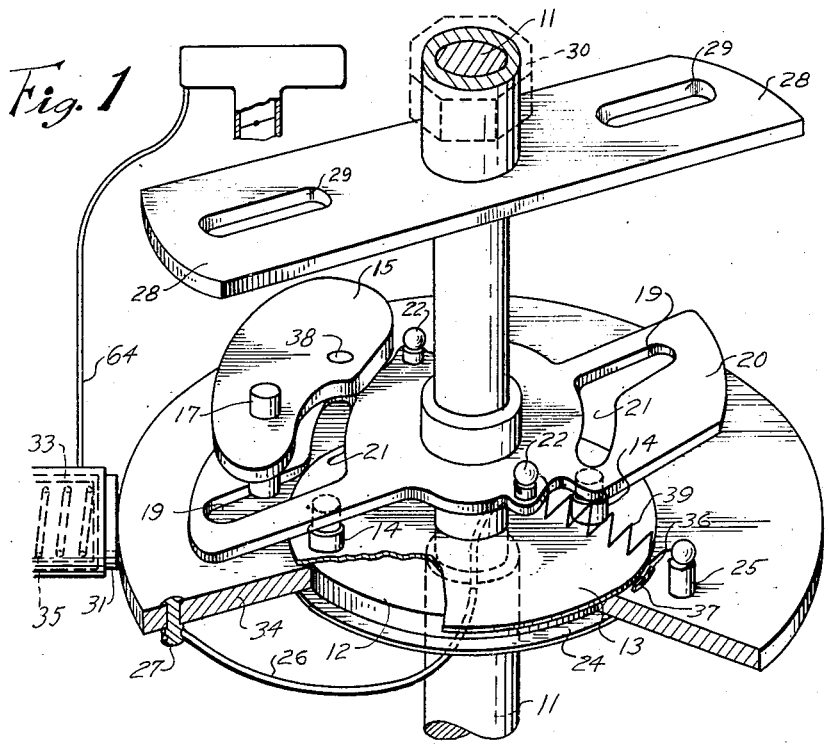
Figure 1 shows in perspective an exploded view of the complete mechanism.
Figure 2:
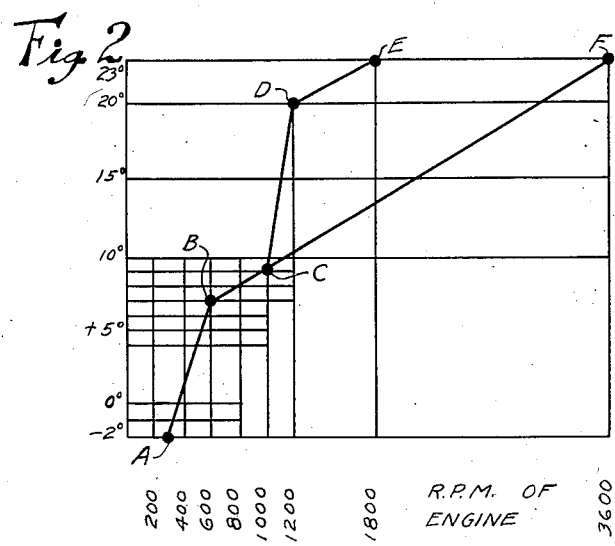
Figure 2 shows diagrammatically the novel governor characteristic referred to above.

In the Figures 1, 2, 3, 4 and 5:—

11 is the driving shaft carrying a driving plate which is keyed or otherwise secured to rotate therewith and comprises the main body 12, a lower plate 24 and an upper plate 13 forming a U shaped groove between 24 and 13. Into this groove, fits the annular outer plate 34. Mounted on the inner plates 12, 13 and 24 are the two pins 14 on which pivot the two governor weights 15 and 16. The governor weights, in their turn, carry pins 17 and 18. These pins extend on both sides, and above and below the governor weights, and engage with the slots 19 in the governor control plate 20. Two circumferential slots 21—21 are provided in this plate 20, so that at low speed it may lag behind the plate 12 without striking the pins 14. The pins 14 extend through the slots 21 and the drilled hole 38 in the weight 15 engages with the upper end of the pin 14. Primary tension springs 39, which are initially disposed radially, are connected at their inner ends to spring supports 22 on the plate 20 and are connected at their outer ends to spring supports 25 on the outer annular plate 34. A secondary spring 26, disposed circumferentially, connects the plates 34 and 12 to each other and is herein shown as anchored at one end to plate 34 by means of the pin 27, the other end being securely embedded in or otherwise secured to the plate 12.

Referring again to the governor weights, the upper ends of the pins 17 engage with the slots 29 of the cam plate 28. Mounted on this plate 28 is the circuit breaker cam 30, but its function is so well known, that there is no need to discuss this portion of the device in this application.

A friction braking device 31 is provided for checking the rotation of the outer driven plate 34, relative to the inner driven plate 12. This brake 31 forms the end of the piston, which slides in the cylinder 33 and compresses a spring 35. See Fig. 3. This cylinder communicates with an inlet manifold of an internal combustion engine (not shown) through a pipe 64, and applies inlet manifold suction to the piston 33. This suction is resisted by the spring 35, which is either calibrated or adjusted to give the desired results.

To limit the relative movement between the driving plate 12 and the driven plate 34, a slot 36 (see Figure 1) is provided in 34. Into this slot, projects a pin 37, which is mounted on the lip 24 of the plate 12.

Operation

In the operation of the device, the two weights are arranged so that at dead idle that is to say the lowest possible speed at which the engine will continue to function without load, there is very little play of the pins 17 and 18 in the slots 19. The friction of the circuit breaker mechanism (not shown), acting on the cam 30, is sufficient to hold the weights in when idling. As soon as the idle speed (250) is exceeded, however, the centrifugal force on the weights 15 produces the advance A—B. Thereafter, the advance of the ignition is checked by the springs 39, which are stretched by the circumferential displacement of their inner ends, because they are no longer radial. The influence of the springs 39 produces the line B—C—F on the chart in Figure 2. When the springs 39 are stretched to the point corresponding to the point C in Figure 2, the circumferential component overcomes the tension of the spring 26. Thereupon, the ignition takes a sudden "hop" C—D, comparable to the "hop" A—B. This "hop" C—D brings the pin 37 as far forward as it can go in the slot 36. Thereafter, the spring 39 continues as before to control the advance of the ignition along the line D—E. The function of the vacuum brake 31 prevents this "hop" C—D taking place, and compels the governor to follow the line B—C—F, whenever the engine is operating under a heavy load. This vacuum control has only an indirect bearing on this invention, which is directed mainly towards producing the "hop" C—D, which is the novel characteristic of this invention. The function of the friction brake is to delay the full advance until maximum speed is reached, and, to eliminate the sudden advance, which takes place when running under a light load.

*Description of alternative construction*

In the Figures 6, 7, 8, 9, 10 and 11:—

Figure 3:
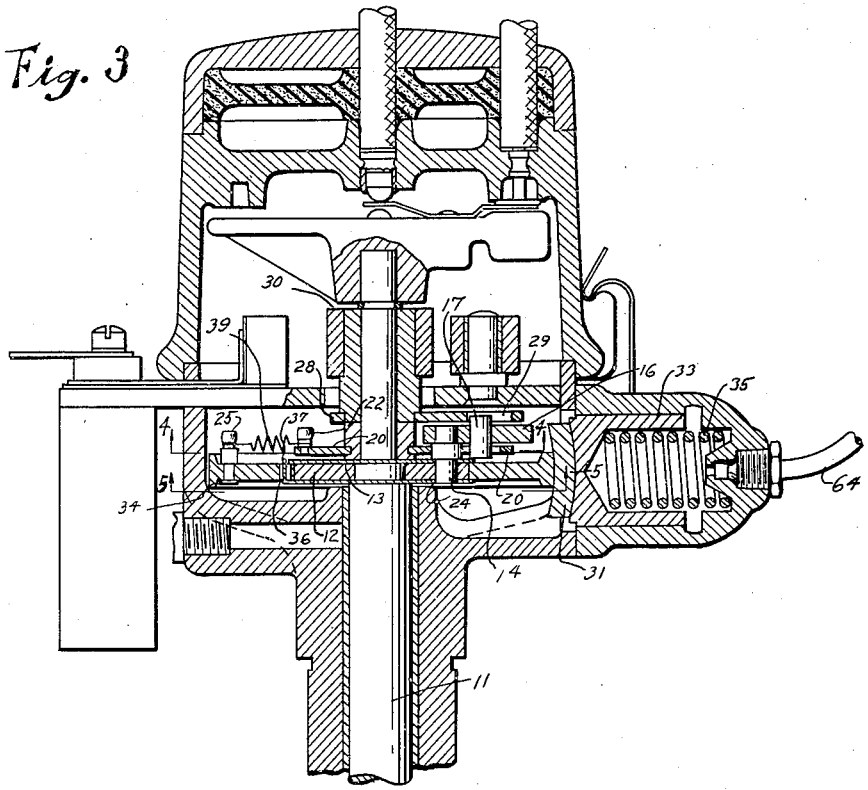
Figure 3 shows a cross-sectional elevation on the plane 3—3 of Figure 4.
Figure 4:
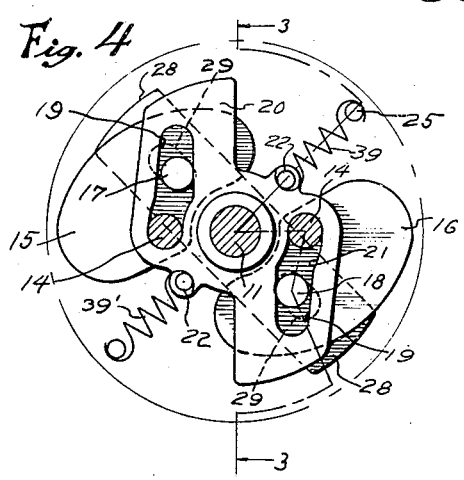
Figure 4 shows a plan view looking upwards on plane 4—4 of Figure 3.
Figure 5:
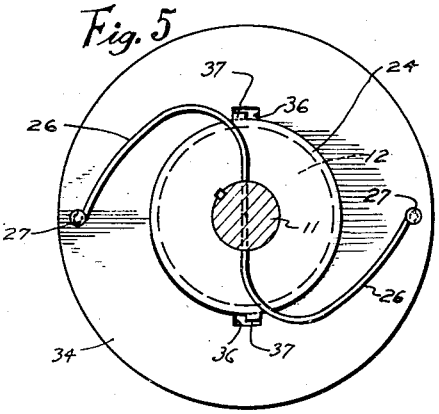
Figure 5 shows a plan view looking upwards on the plane 5—5 of Figure 3.
Figure 6:
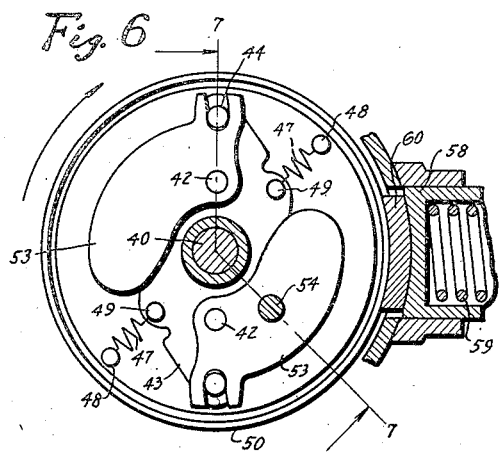
Figure 6 shows a plan view of a modified form of my invention looking down on the plane 6—6 of Figure 7.
Figure 8:
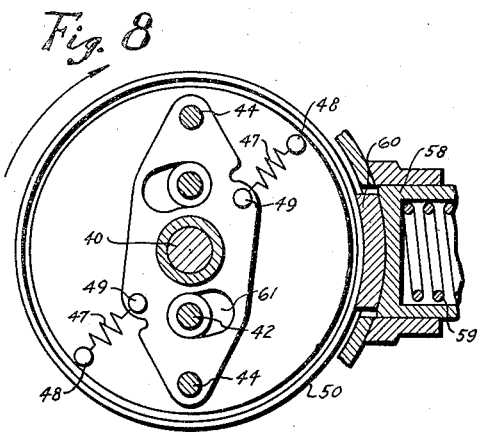
Figure 8 shows a plan view looking down on the plane 8—8 of Figure 7.
Figure 9:
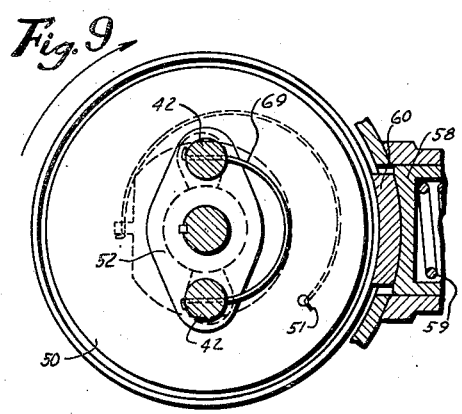
Figure 9 shows a plan view looking down on the plane 9—9 of Figure 7.

40 is the driving shaft (Fig. 7) carrying a driving plate 41 which is keyed or otherwise secured to rotate therewith and on which are mounted the pins 42. These pins are held in place by a spring cotter pin 69. These pins 42 pass through the slots 61—61 in plate 43 (see Fig. 8), which slots limit the possible spark advance. This plate 43 is arranged to carry the pins 44, which engage with corresponding slots in the tips of the governor weights 53. The load on the governor weights is imposed by means of the two radial springs 47, each of which is stretched between the two pins 48—49. Pins 48 are mounted on the friction disc 50 and the pins 49 on the driving plate 43. The friction disc 50 is connected with the driving shaft 40 through the circumferential spring 51. (See Fig. 9.) The disc 50 is permitted a slight angular movement relative to the shaft 40 by reason of the slots 62 in the disc 50 through which slots the pins 42 extend (see Fig. 10) corresponding to the pin 37 in the slot 36 of Fig. 1. One of the governor weights 53 carries a pin 54, which engages with a slot 63 in a plate 45 of Fig. 7 similar in design and purpose to the slotted plate 28 shown in Fig. 1. A friction piston 58 applies friction through a pad 60 (leather) by means of the spring 59; this piston 58 is operated by inlet vacuum as shown in Figs. 1 and 3.

Figure 11:
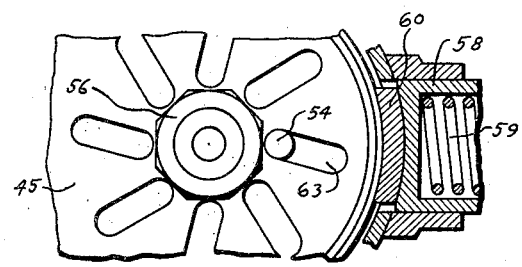
Figure 11 shows a plan view looking down on Figure 7.

In Fig. 11, 63 is one of a number of slots in the disc 45, which controls the advance of the cam 56. These slots are all given a different angle so as to vary the effect of the governor on the amount of ignition advance, which a given movement of the pin 54 causes. See my U. S. Patent No. 1,967,445 dated July 24, 1934.

*Operation*

In Figures 6, 7, 8, 9, 10 and 11:—

When the engine increases in speed, the inlet vacuum being sufficiently great to release the friction brake 60 then the centrifugal force of the weights 53 acting about the pins 42 displaces the forked ends of 53 so as to twist the plate 43. This twisting sets up a circumferential component at 48 through the radial spring 47, which overcomes the circumferential spring 51 and the ignition cam 56 is suddenly advanced the limited amount permitted by the slot 62, Fig. 10. (See the "hop" C—D of Fig. 2.) After this sudden advance, the centrifugal weights resume their simple function of advancing the ignition as the engine speeds up.

If there is little or no vacuum (heavy engine load), then the piston 58 acting through the pad 60 presses against the disc 50 and the "hop" C—D will not take place. Instead, the centrifugal weights 53—53 advance the spark with the speed indicated by the line C—F, as already explained in connection with Figures 1, 3, 4 and 5.

Figure 7:
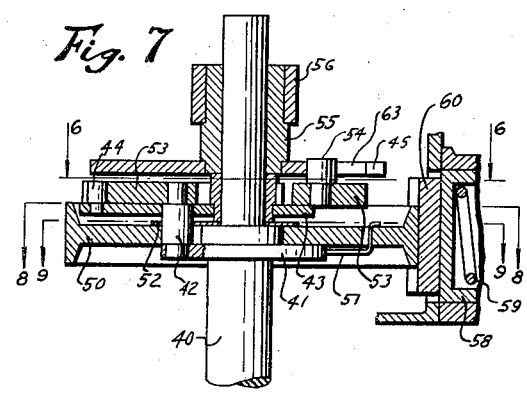
Figure 7 shows a cross-sectional elevation on the plane 7—7 of Figure 6.
Figure 10:
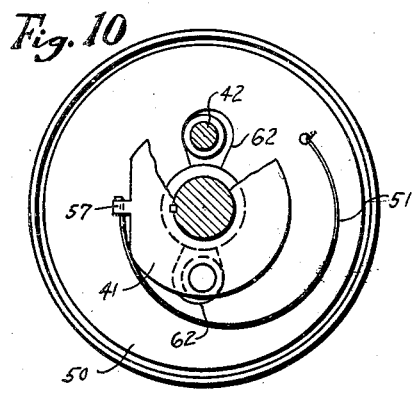
Figure 10 shows a plan view looking up on Figure 7 from below.

In Figs. 7 and 11 is shown a very simple method of changing the amount of advance, because, by selecting the correct slot 63, any desired amount of ignition advance can be secured. As there is only one pin 54, twice the number of steps of graduation is possible than would be the case were there two pins 54; one on each governor weight 53. It is noted that the fact that the two governor weights are coupled together through the plate 43 so that one cannot get ahead of the other makes it possible to drive through one pin 54. If each of the two governor weights could move independently of the other, this would not be possible and the number of graduations would be cut in half.

What I claim is:—

1. In an ignition governor for internal combustion engines, an outer driven plate, an inner driving plate concentric therewith, a governor weight pivoted on the driving plate, a slotted circuit breaker cam plate adapted to be driven by said governor weight, a slotted governor weight control plate located between said cam plate and said inner driving and outer driven plates and adapted to control the relative movement of said governor weight, a substantially radial spring connected at its inner end with said governor weight control plate and at its outer end with said outer driven plate, a second spring connected to said inner driving and said outer driven plates so as to oppose angular movement therebetween, a stop limiting the movement between said outer and inner plates, whereby, as the governor weight first moves out under the influence of centrifugal force, it immediately rotates the governor control plate relative to the outer plate, and thereby displaces and stretches the radial spring so as to set up a circumferential component, which component overcomes said second spring at some predetermined speed, and thereupon the governor weight flies out and rapidly moves the cam plate, relative to the driving plate, the angular distance as determined by the said limiting stop.

2. In an ignition governor for internal combustion engines, a driving plate having governor weights pivotally mounted thereon, a driven plate, a slotted governor control plate, double spring control means for said weights comprising a spring extending circumferentially from said driving plate to said driven plate and a radial spring extending from the latter to the slotted governor control plate, said control plate being adapted to engage with said governor weights and to impose thereon the combined resistance of said radial and circumferential springs.

3. Control means for the pivoted centrifugal weights of an ignition governor, comprising driving means for said weights, a slotted control plate engaging with said governor weights and having a radial spring adapted to resist the relative rotation of the governor weights around their pivots under the influence of centrifugal force, a driven plate, said radial spring being anchored to said driven plate, means for initially driving the driven plate, consisting of a circumferential spring, until the speed exceeds a predetermined minimum whereupon the circumferential component of said radial spring displaced by centrifugal force is adapted to overcome the circumferential spring and thereby permit the governor weights to fly out quickly, and a stop limiting the relative movement between the driven and driving plates.

4. In an ignition governor for internal combustion engines, having a driving plate and a driven plate concentric therewith and means for permitting only a limited angular movement therebetween and a governor weight control plate; a governor weight pivotally mounted on the driving plate and adapted to advance a circuit breaker cam, double spring control means for said weight comprising a spring extending substantially circumferentially from said driving plate to said driven plate, and a second spring extending substantially radially from the driven plate to said governor weight control plate, said plate being adapted to engage with and oppose the centrifugal force exerted by the governor weight first with the resistance of said radial spring alone, then combined with the resistance of said circumferential spring, and again with the resistance of said radial spring.

5. In an ignition governor for internal combustion engines, having a driving plate and a driven plate concentric therewith and means for permitting only a limited angular movement therebetween and a governor weight control plate, a governor weight pivotally mounted on a driving plate and adapted to advance a circuit breaker cam, double spring control means for said weight comprising a spring extending substantially circumferentially from said driving plate to said driven plate, and a second spring extending substantially radially from the driven plate to said governor weight control plate, said governor control plate having a pin located on its periphery, a slot formed in the governor weight control plate and adapted to engage with said pin whereby the centrifugal force exerted by the governor weight first moves the driven plate rapidly a limited number of degrees as determined by the radial movement permitted between the driving and driven plates against the resistance of the circumferential spring, and then more slowly against the resistance imposed by the radial spring.

6. In an ignition governor for internal combustion engines, a driving plate, a pair of governor weights pivotally mounted thereon, a governor weight control plate, spring means acting between the driving plate and the governor control plate, said control plate being adapted to positively engage with the governor weights whereby the weights are coupled together, ignition timing means comprising a timing cam and a cam plate in fixed relation thereto, a plurality of slots in said plate, a pin in one of the governor weights, said pin engaging with one of the slots in said cam plate.

7. In an ignition governor for internal combustion engines, a driving plate, a plurality of governor weights pivotally mounted thereon, a governor weight control plate, spring means acting between the driving plate and the governor control plate, said control plate being adapted to positively engage with the governor weights whereby the weights are coupled together, ignition timing means comprising a timing cam and a cam plate in fixed relation thereto, a plurality of slots in said plate, a pin on one of the governor weights, said pin engaging with one of the slots in said cam plate.

8. An ignition governor for internal combustion engines comprising a driving plate, a governor weight pivotally mounted thereon, a governor weight control plate engaging with said governor weight, a plurality of governor control springs interposed in series between the driving plate and the governor control plate, one of said springs being designed to yield at a relatively low speed, and stop means for limiting the yielding of the other spring.

9. In an ignition governor for internal combustion engines, a rotatable driving member, a governor weight pivoted thereon, a timing device, means to advance the timing device with reference to the driving member as the governor weight moves outwardly about its pivot, a spring resisting such advance, and means for partially relieving the tension of said spring after a predetermined advance of the timing, to effect a comparatively abrupt further advance.

10. In an ignition governor for internal combustion engines, a rotatable driving member, a governor weight pivoted thereon, a timing device, means to advance the timing device with reference to the driving member as the governor weight moves outwardly about its pivot, a coil spring with a mounting at each end, means connecting one mounting with the timing device to advance therewith, thereby stretching the spring, and means yieldably connecting the other mounting to said driving member.

11. In an ignition governor for internal combustion engines, a rotatable driving member, a governor weight pivoted thereon, a timing device, means to advance the timing device with reference to the driving member as the governor weight moves outwardly about its pivot, two springs interposed in series between the governor weight and the driving member, means for exerting the initial centrifugal force of the governor against the first of said springs, and means rendered effective only by the displacement of the first spring to exert the centrifugal force of the governor against the other of said springs.

12. In an ignition governor for internal combustion engines, a rotatable driving member, a governor weight pivoted thereon, a timing device, means to advance the timing device with reference to the driving member as the governor weight moves outwardly about its pivot, a coil spring initially radial to the axis of the driving member with a mounting at each end, means connecting one mounting with the timing device to advance therewith, thereby setting up a circumferential component to the tension of the spring, and a second spring yieldably holding the other mounting in its initial position and adapted to be overcome by said circumferential component when the first mounting has completed a predetermined advance.

13. In an ignition governor for internal combustion engines, primary means for effecting an advance of the spark in predetermined relation to the speed of operation, secondary means rendered effective above a predetermined speed for effecting an advance beyond that caused by the primary means, and means preventing the operation of said secondary means under predetermined operating conditions.

MARION MALLORY.